United States Patent [19]

Monetti

[11] Patent Number: 5,520,102

[45] Date of Patent: May 28, 1996

[54] THERMOREGULATED ASSEMBLY FOR THE DISTRIBUTION OF WARM MEALS WITHIN ISOTHERMAL CONTAINERS

[75] Inventor: Giovanni Monetti, Manta di Saluzzo, Italy

[73] Assignee: Monetti S.p.A., Racconigi, Italy

[21] Appl. No.: 367,868

[22] Filed: Jan. 3, 1995

[30] Foreign Application Priority Data

Feb. 22, 1994 [IT] Italy ................................. TO94A0107

[51] Int. Cl.⁶ ........................... A47J 39/00; A47J 39/02; A47J 47/14; F25B 29/00
[52] U.S. Cl. ................ 99/483; 99/448; 99/467; 165/64; 165/919; 219/386; 219/521
[58] Field of Search ................... 99/483, 467, 473–476, 99/448, 447; 165/64, 26, 918, 919; 312/236; 219/385, 386, 387, 521

[56] References Cited

U.S. PATENT DOCUMENTS

| | | | |
|---|---|---|---|
| 3,760,155 | 9/1973 | Polansky | 99/447 |
| 3,924,100 | 12/1975 | Mack et al. | 312/236 |
| 4,068,115 | 1/1978 | Mack et al. | 99/447 |
| 4,093,041 | 6/1978 | Davis et al. | 312/236 |
| 4,254,824 | 3/1981 | Springer. | |
| 4,285,391 | 8/1981 | Bourner | 219/521 |
| 4,346,756 | 8/1982 | Dodd et al. | 165/64 |
| 5,028,761 | 7/1991 | Oda et al. | 219/386 |
| 5,069,273 | 12/1991 | O'Hearne | 99/483 |
| 5,093,556 | 3/1992 | Oelfke | 219/386 |
| 5,201,364 | 4/1993 | Tippmann et al. | 99/448 |
| 5,276,310 | 1/1994 | Schmidt et al. | 219/521 |
| 5,403,997 | 4/1995 | Wimpee et al. | 165/919 |

FOREIGN PATENT DOCUMENTS

| | | |
|---|---|---|
| 1423691 | 3/1966 | France. |
| 2208627 | 6/1974 | France. |
| 2207676 | 6/1974 | France. |
| 2349112 | 11/1977 | France. |
| 2391687 | 12/1978 | France. |
| 2758805 | 7/1978 | Germany. |
| 1599108 | 9/1981 | United Kingdom. |
| 9112473 | 8/1991 | WIPO | 219/386 |

Primary Examiner—Timothy F. Simone
Attorney, Agent, or Firm—Sughrue, Mion, Zinn, Macpeak & Seas

[57] ABSTRACT

Thermoregulated assembly for the distribution in collective catering of warm meals within isothermal containers having a tray which incorporates a thermoregulation system including at least one electrical heating resistor. The distribution assembly comprises a transport device including, for each isothermal container, a support, a multiple contact unit cooperating with electrical contact means of the isothermal container, and means for connecting the contact unit to an electrical supply source.

9 Claims, 4 Drawing Sheets

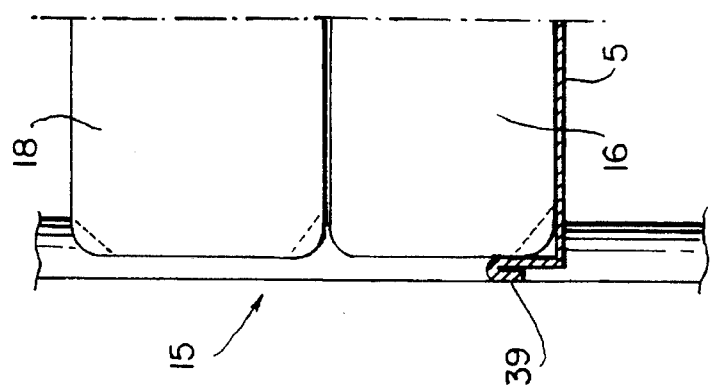
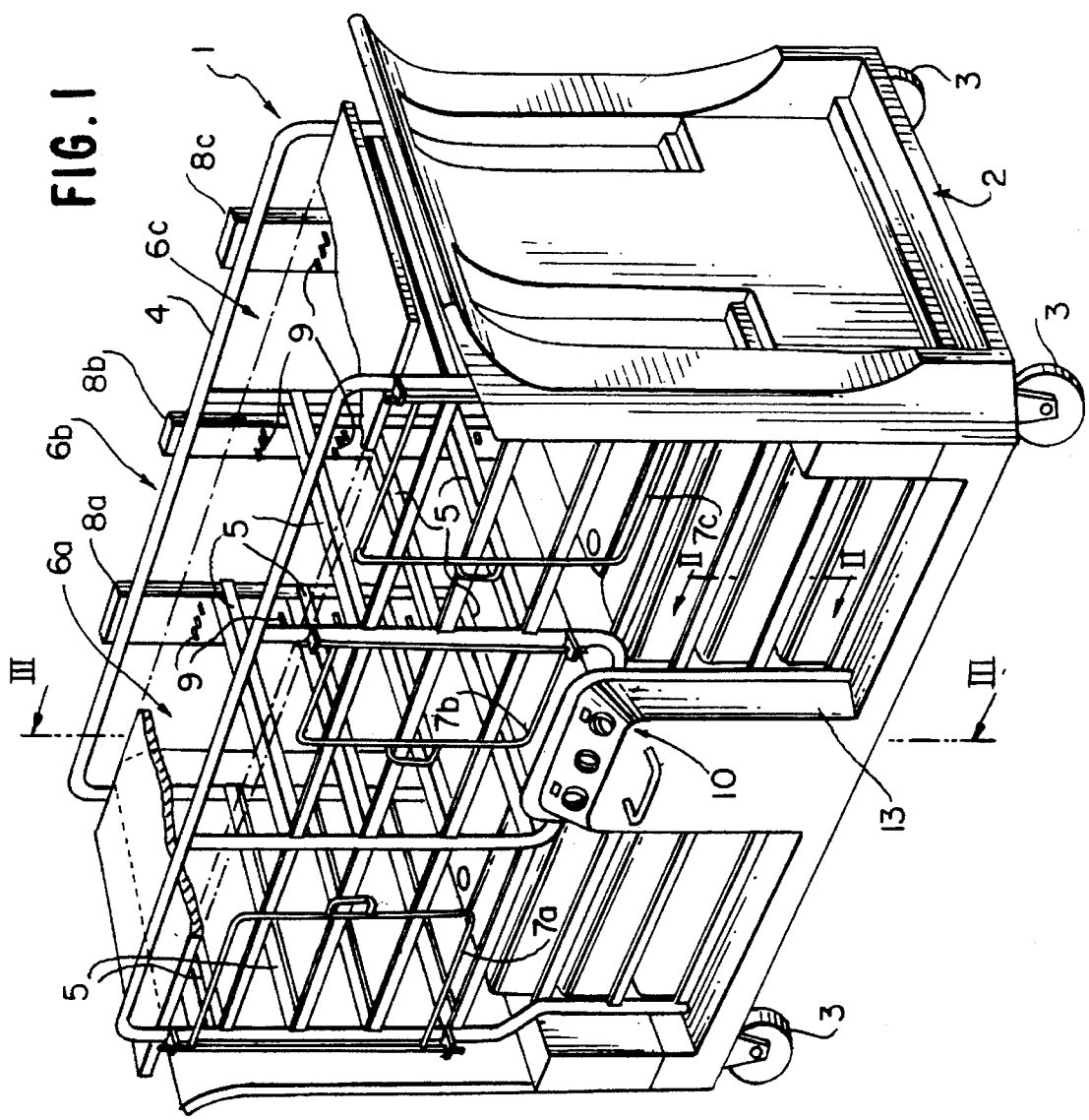

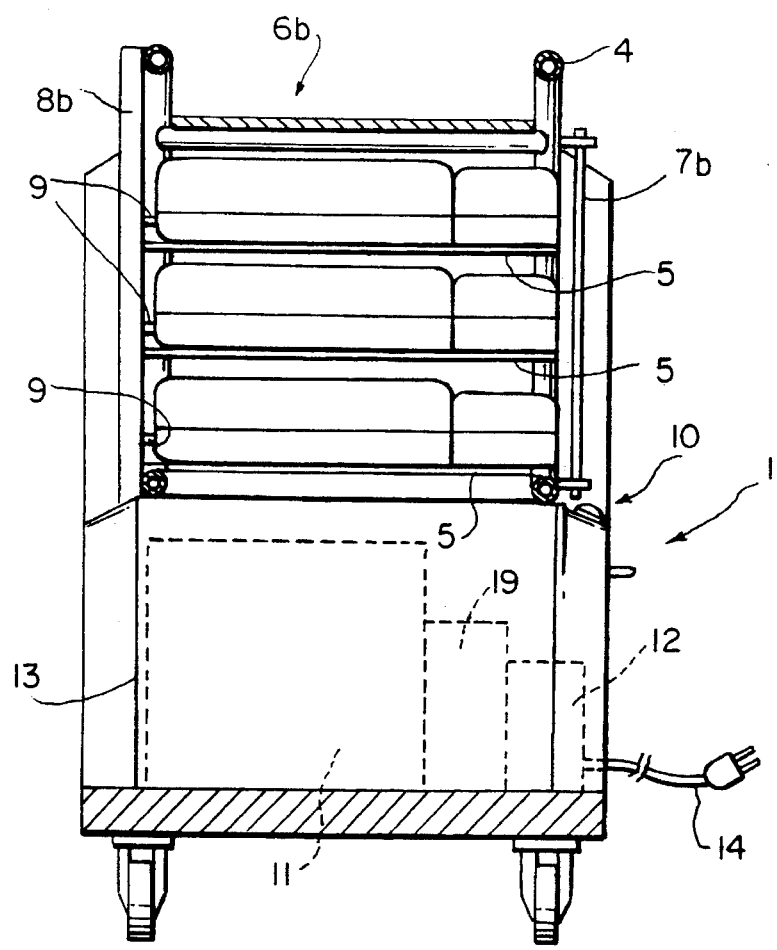
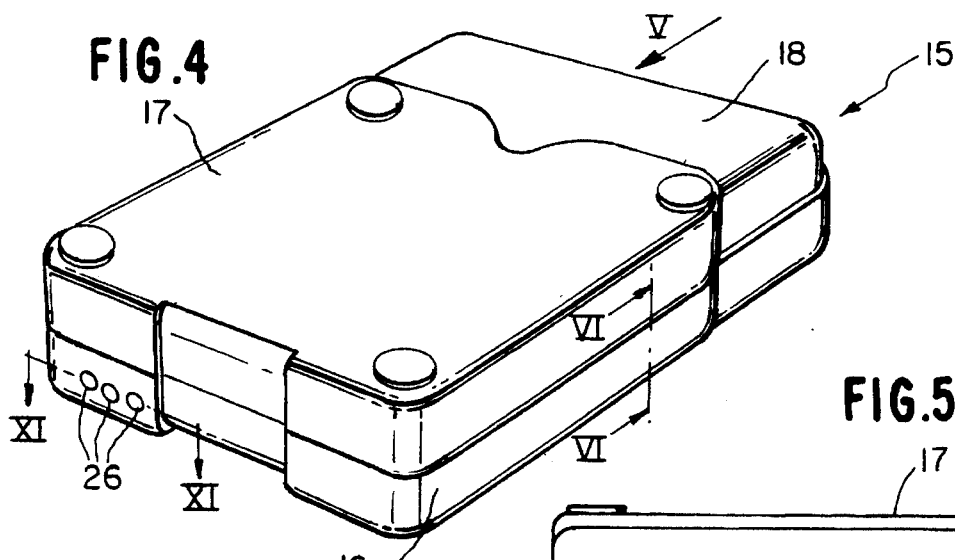
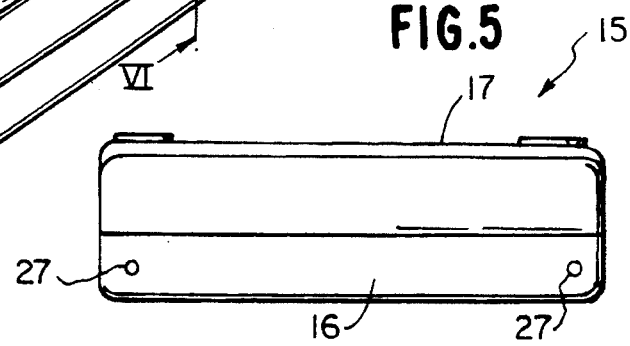

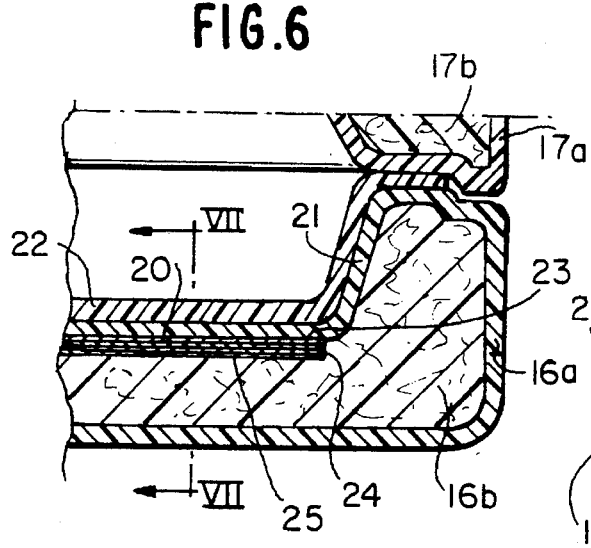
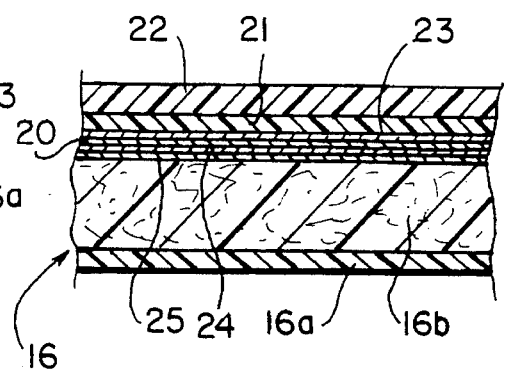
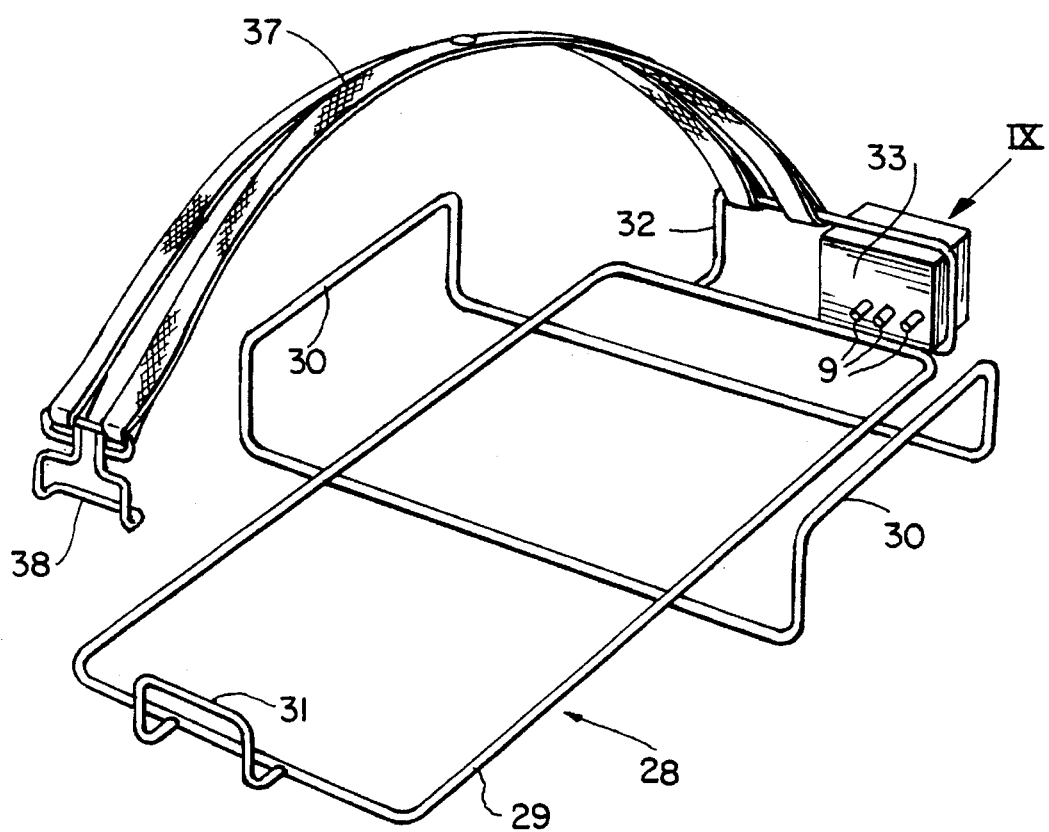

THERMOREGULATED ASSEMBLY FOR THE DISTRIBUTION OF WARM MEALS WITHIN ISOTHERMAL CONTAINERS

BACKGROUND OF THE INVENTION

The present invention is related in general to isothermal containers for the distribution of warm meals, particularly but not exclusively in the field of collective catering, of the type comprising a tray made of a thermally insulating material provided with recesses housing therein respective vessels for containing foodstuffs, at least in part warm, and a cover made of a thermally insulating material detachably applied onto the tray.

Isothermal containers of the above referenced type are presently manufactured and marketed by the Applicant: they provide the ideal solution to the various packaging and distribution requirements of single complete meals, further performing the function of a support when the meal is being taken. These containers are particularly advantageous whenever it is necessary to manage single meals in places which are decentralized from the food cooking installations, such as for instance in the case of hospitals, hotels, congress places, yards, camps, factories etc. Moreover, using these isothermal containers is also particularly useful in case of domiciliary assistance to elderly and non self-sufficient people, as well as of enterprises for the delivery of warm meals at purchaser's door.

In all the above situations the thermally insulating construction of the container enables to thermally insulate from the outer environment the warm foodstuffs contained within the respective vessels housed in the tray recesses: however, when the time between cooking of the foodstuffs and delivery of the container to the consumer is long, there is the risk that the warm foodstuffs get cool, thus jeopardising the fragrance and the organoleptic characteristics of the food. This problem is particularly critical in case of collective distribution of the warm meal containers at a fixed time (for instance in case of a hospital), which is traditionally carried out employing a transport device (normally a trolley) for a number of isothermal containers which are to be one at a time distributed. In fact in this case, in order to preserve as much as possible the thermal characteristics of the warm foodstuffs it is necessary to optimise and coordinate with the best punctuality the cooking phase of the food and the distribution phase of the containers, with evident difficulties under the organising point of view.

SUMMARY OF THE INVENTION

The object of the present invention is to give an efficient and functional solution to the above-referenced problem, and more particularly to provide an assembly for the distribution of warm meals within isothermal containers of the type set forth at the beginning, by means of a transport device enabling thermoregulation of the warm foodstuffs housed in the container so as to keep substantially unchanged the final cooking temperature thereof up to the time of delivery of the container to the consumer.

According to the invention, this object is achieved by virtue of a distribution assembly for the distribution of warm meals within isothermal containers comprising a tray made of a thermally insulating material and provided with recesses housing therein respective vessels for containers foodstuffs which are at least in part warm and a cover made of a thermally insulating material detachably applied onto the tray, wherein:

the isothermal containers each comprise a respective thermoregulation system incorporated in the tray and including at least one electrical heating resistor operatively associated to at least one of said recesses and connected to terminal contact means accessible from outside of the container, the transport device comprises, for each of said isothermal containers, a support having a shape complementary to that of the container, a multiple contact unit cooperating with said terminal contact means when the isothermal container is fitted within said support, and means for connecting said multiple contact unit to an outer electrical supply source.

The invention contemplates two preferred embodiments, in the first one of which the transport device is constituted by a trolley having series of superimposed shelves defining a plurality of supports for respective isothermal containers, and in the second one of which the transport device is constituted by a basket for a single isothermal container.

In both cases the isothermal container is further provided with display means for indicating the energized condition of the or each electrical heating resistor, and the transport device is provided with a control assembly of the multiple contact unit.

The or each electrical heating resistor is conveniently a film resistor and is fitted beneath the bottom of a corresponding recess of the isothermal container tray.

The electrical supply source is to advantage a direct current source, with a rechargeable accumulator battery which in the case of the basket support is provided outside (for instance installed on board of a motor-vehicle), and in the case of the trolley support is conveniently installed on board of the trolley itself. In the latter case it is further conveniently provided a supply from alternate current mains, via a feeder and transformer unit also installed on the trolley.

Through proper sizing of the or each electrical heating resistor it is possible to avoid employing sophisticated control apparatus of the electrical supply, and to achieve a thermoregulation action—keeping the or each resistor constantly energized—so as the temperature of the warm foodstuffs is constantly maintained, during the distribution phase of the or each isothermal container, at a value substantially not lower than about 65° C.

Accordingly it is possible to keep low the manufacturing cost both of the isothermal containers and of the related transport device of the distribution assembly according to the invention.

A further advantage of the invention resides in that the distribution assembly according to the invention may also be employed as a dish heating appliance, prior to introducing the warm foodstuffs into the respective dishes or vessels in general housed within the tray recesses. This further ensures a total organising flexibility between the phase of food cooking and that of delivery to the consumers.

BRIEF DESCRIPTION OF THE DRAWINGS

Further features and advantages of the invention will become apparent from the following detailed description, with reference to the annexed drawings purely provided by way of non-limiting example, in which:

FIG. 1 is a diagrammatic and somehow simplified perspective view of a thermoregulated assembly according to a first embodiment of the invention, for the collective distribution of warm meal isothermal containers, FIG. 2 is a partial vertically sectioned and enlarged view along line II—II of FIG. 1, FIG. 3 is a partially vertically sectioned view along line III—III of FIG. 1, FIG. 4 is a diagrammatic and enlarged perspective view of one of the isothermal containers of the distribution assembly, FIG. 5 is a front elevational view according to arrow V of FIG. 4, FIG. 6 is a vertically sectioned and enlarged view along line VI—VI of FIG. 5, FIG. 7 is a sectioned and enlarged view along line VII—VII of FIG. 6, FIG. 8 is a diagrammatic perspective view of the transport device according to a second embodiment of the distribution assembly of the invention.

DETAILED DESCRIPTION OF THE INVENTION

Figure 9:
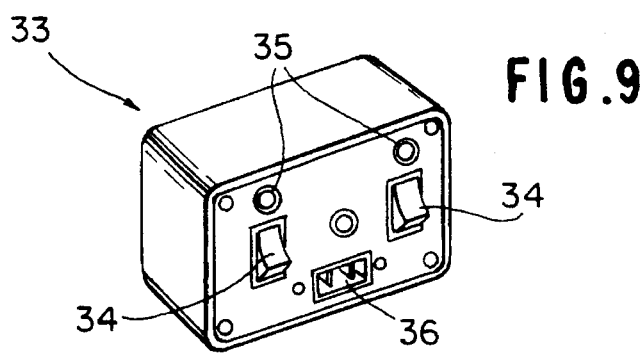
FIG. 9 is a perspective and enlarged view of the detail indicated by arrow IX in FIG. 8.

Referring initially to FIGS. 1 through 3, reference numeral 1 generally designates a trolley which, according to a first embodiment, constitutes the transport device of the thermoregulated distribution assembly according to the invention.

The trolley 1 consists of a sturdy metal support structure 2 provided with castor wheels 3 and carrying superiorly a framework 4 formed with a series of superimposed shelves which, according to the shown example, are simply constituted by pairs of horizontal angle bars 5. The shelves 5 are arranged, in the case of the shown example, according to three side by side columns 6a, 6b and 6c. Naturally the conformation and arrangement of these shelves 5 may be widely varied as a function of the use demands.

In correspondence of one side of the shelves 5, the framework 4 of the trolley 1 is provided with a corresponding series of latching walls 7a, 7b and 7c which are displaceable between a closed position, shown in the drawings, and an open position. These latching walls may be conveniently equipped with positioning members for steady locking thereof in one or in the other position, as well as with spring push members (not shown in the drawings) facing towards the interior of the shelves 5.

On the opposite side, the framework 4 carries three struts 8a, 8b and 8c each of which is provided, in predetermined positions with respect to the levels of the respective shelves 5, with a corresponding series of multiple contact units 9, all of which are electrically connected to a main control unit 10.

In the case of the shown example, each contact unit 9 is constituted by a triad of electrically conductive pins, horizontally sliding against the action of respective thrust springs (not shown in the drawings).

The main control unit 10 is intended to control supply of the multiple contact units 9 from a direct current electrical supply source. This source comprises a rechargeable accumulator battery 11 and associated power supply device 12 and transformer 19, fitted within a central container 13 of the trolley 1. The power supply device 12 is adapted to be connected to alternate current mains via a feeding cord 14.

The control unit 10 is extremely simple, since it is solely comprised of an operation display and of a switching device through which separate or joint supply of the various contact units 9 associated to the three struts 8a, 8b and 8c can be controlled.

The shelves 5 are intended to receive each a respective isothermal container, of the type generally designated as 15 in FIGS. 4 through 7. It is to be pointed out that the isothermal container 15 shown in the example might be replaced by containers of a different shape, provided that same are conceptually and functionally similar.

The container 15 has a general structure of known type, since presently manufactured and marketed by the Applicant under the trade name "Eurotherm TS-50": for the sake of brevity, the detailed description thereof shall thus be limited only to the novel and peculiar features.

The isothermal container 15 is constituted by a tray 16 having a thermally insulating construction, provided with recesses 21 (FIG. 6) variously arranged for housing therein respective vessels 22 containing foodstuffs, at least in part warm, by a cover 17 also having a thermally insulating construction and covering the tray 16 for the major part thereof, and by a further transparent cover 18 defining a neutral compartment with the remaining portion of the tray 16.

As it is shown in better detail in FIG. 6, both the tray 16 and the cover 17 are constituted by a shell 16a, 17a made of a shock-resistant and scratch-resistant plastic material for foodstuff use, formed by blow-moulding and filled with a thermally insulating foamed polyurethane 16b, 17b, respectively.

The cover 17 is detachably applied on the tray 16, and latching means, not shown, may also be provided for the mutual locking thereof.

According to a primary aspect of the invention, the isothermal container 15 is distinguished over those currently manufactured by the fact that it comprises a thermoregulation system incorporated within the tray 16 and adapted to be electrically supplied by the transport device, i.e., in the case of the embodiment disclosed herein, by the supply source 11–12–19 of the trolley 1.

This thermoregulation system comprises at least one electrical film resistor 20 applied beneath the bottom of a corresponding recess 21 containing a respective vessel (dish or cup) 22 for a warm foodstuff. In the case of a Mediterranean diet meal, the tray 16 normally incorporates (as in the shown example) two such resistors 20: it is however evident that different arrangements are comprised within the scope of the present invention.

As it is shown in better detail in FIG. 7, the or each heating resistor 20 is arranged between two thin bi-adhesive material sheets of which the upper one, indicated as 23, is securing the resistor 20 under the bottom of the recess 21, and the lower one, indicated as 24, is adhering to a protective sheet 25 of cardboard or like material.

Figure 11:
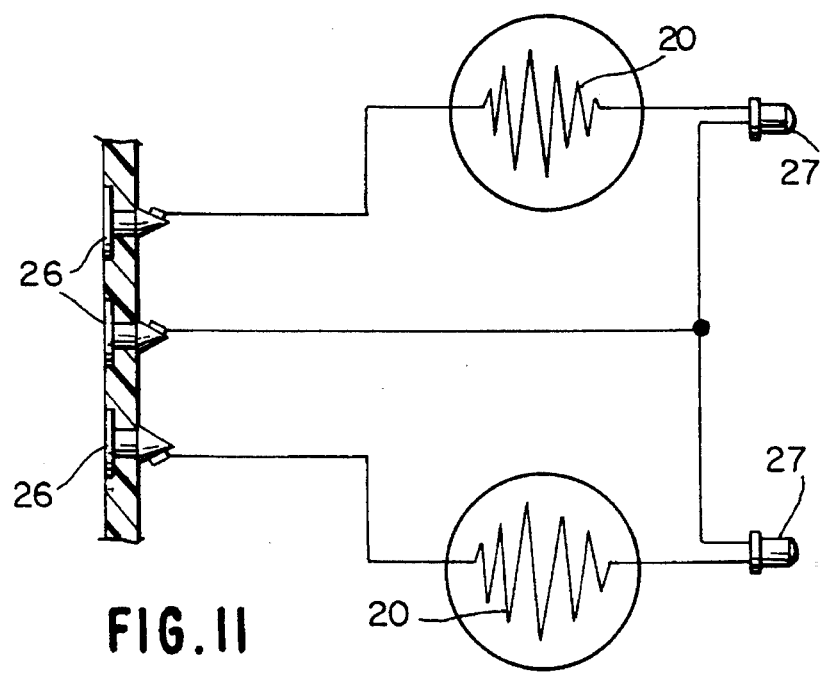

FIG. 11 shows the wiring diagram of the thermoregulation system, assuming that two heating resistors 20 are employed: the circuit simply comprises electric wires connecting the resistors 20 to respective terminal contacts 26, constituted by conductive elements placed on the surface of one end of the tray 16. A third identical conductive element 26 is connected to a pair of display LEDs 27, arranged at the opposite side of the tray 16 (FIG. 5) and intended to display the energized condition of the respective resistors 20. The circuit may further comprise auxiliary capacitors and resistors, not shown, operatively associated to the LEDs 27.

The position and arrangement of the terminal contacts 26 is such that, when the isothermal container 15 is positioned onto a respective shelve 5 of the trolley 1, these contacts 26 come into electrical contact with the triad of contact elements of the respective contact unit 9. Electrical connection is ensured on one hand by the spring push members (not shown) associated to the contact elements of the contact unit 9 and, on the other hand, by the presence of a front wall 39, shown in detail in FIG. 2, associated to each shelve 5 and whose function is to perform proper positioning of the isothermal container 15 upon the respective shelve 5. This positioning is further ensured, during transportation of the trolley 1, by the movable walls 7a, 7b and 7c previously disclosed.

In operation, after the isothermal containers 15 containing warm meals have been lodged onto the respective shelves 5, the trolley 1 can be transferred for distribution thereof to the consumers, maintaining the foodstuff temperature at a substantially constant value, not lower than 65° C. To such effect it is sufficient to activate through the control unit 10 the thermoregulation systems of the isothermal containers 15, thus energising the respective heating resistors 20 through the battery 11. In case of stops (and also possibly during a preliminary pre-heating phase of the foodstuff vessels 22), electrical supply of the resistor 20 may also be performed by a mains through the cord 14 and the transformer 19. During thermoregulation phases, the proper operation of the resistors 20 is displayed by the LEDs 27 of each container 15.

Alternatively to employing the trolley 1 for the collective distribution of the isothermal containers 15, the invention contemplates a different transport device which is intended to be used for a single isothermal container 15. This alternative transport device is generally indicated as 28 in FIGS. 8 and 10, and is constituted by a basket of metal wire defining a base 29, two lateral sides 30, a front retainer 31 and a back retainer 32, defining a receptacle having a shape complementary to that of the isothermal container 15.

In this case the multiple contact unit 9 with the triad of resilient contact elements is carried by an autonomous control unit 33 secured to the back retainer 32 and comprising, as it is illustrated in better detail in FIG. 9, switches 34 and light emitting displays 35 for the control of the electrical supply and joint and/or separate activation/disactivation of the heating resistors 20. The control unit 33 is also provided with a connecting plug 36 for the connection thereof, through an electrical cord not shown, to a socket in turn connected to a direct current outer supply source. This socket may be constituted, for instance, by a cigarette-lighter socket of a motor vehicle.

Figure 10:
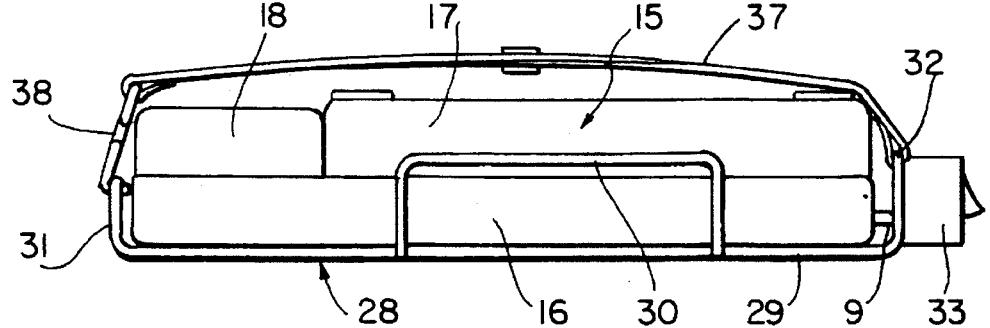
FIG. 10 is a lateral elevational view of the support shown in FIG. 8 with the isothermal container of FIG. 4 fitted therein, and FIG. 11 diagrammatically shows the electrical circuit of the isothermal container.

For securing the isothermal container 15 relative to the basket 28, a double transport flexible band 37 is provided, which is anchored at one end to the back retainer 32 and is provided at the other end with a latching member 38 for anchoring thereof to the front retainer 31, as depicted in FIG. 10.

Also in this case electrical supply to the resistors 20 is evidently performed by virtue of the multiple contact unit 9 and the terminal contacts 26 arranged at the rear end of the tray 16 of the container 15.

Naturally the details of construction and the embodiments may be widely varied with respect to what has been disclosed and illustrated, without thereby departing from the scope of the present invention, such as defined in the appended claims.

What is claimed is:

1. A thermoregulated assembly for the distribution of warm meals within isothermal containers comprising a tray made of a thermally insulating material and provided with recesses housing therein respective vessels for containing foodstuffs which are at least in part warm and a cover made of a thermally insulating material detachably applied onto the tray, said assembly comprising a transport device for the isothermal containers, wherein:

said isothermal containers are each comprised of a thermoregulation system incorporated within the tray and including at least one heating resistor operatively associated with at least one of said recesses, and terminal electrical contact means connected to said at least one heating resistor and accessible from outside of the container, said transport device comprises a support for each of said isothermal containers having a shape complementary to that of the container, a multiple contact unit cooperating with said terminal electrical contact means when said isothermal container is fitted within said support, and means for connecting said multiple contact unit to an electrical supply source.

2. Assembly according to claim 1, further comprising resilient thrust means between said multiple contact unit and said terminal contact means.

3. Assembly according to claim 1, wherein said isothermal container is further provided with display means for displaying the energized condition of each electrical heating resistor.

4. Assembly according to claim 1, wherein the transport device is provided with a control unit for said multiple contact unit.

5. Assembly according to claim 1, wherein said at least one electrical heating resistor is a film resistor and is fitted beneath the bottom of a corresponding recess of the tray of the isothermal container.

6. Assembly according to claim 1, wherein the transport device comprises a trolley having series of superimposed shelves defining a plurality of said supports, each shelf having positioning means for a respective isothermal container; a respective multiple contact unit being associated with each shelf, and the multiple contact units being connected to a common electrical supply source via a main control unit.

7. Assembly according to claim 6, wherein the electrical supply source comprises a rechargeable accumulator battery and a power supply and transformer unit.

8. Assembly according to claim 6, wherein releasable latching means for the isothermal containers are associated with said superimposed shelves.

9. Assembly according to claim 1, wherein the transport device comprises a basket and associated retainer members for a single isothermal container, and a control unit for connection to an outer electrical supply source.

* * * * *